(No Model.) 5 Sheets—Sheet 1.

E. V. WILLIAMS & S. W. JAMESON.
ADDING MACHINE.

No. 549,302. Patented Nov. 5, 1895.

WITNESSES
L. S. Elliott
C. W. Johnson

INVENTORS
Elmer V. Williams
and
Stewart W. Jameson
by _____ Attorney (No Model.) 5 Sheets—Sheet 4.

E. V. WILLIAMS & S. W. JAMESON.
ADDING MACHINE.

No. 549,302. Patented Nov. 5, 1895.

WITNESSES
L. S. Elliott
T. W. Johnson

INVENTORS
Elmer V. Williams
Stewart W. Jameson
by — Attorney (No Model.) 5 Sheets—Sheet 5.

E. V. WILLIAMS & S. W. JAMESON.
ADDING MACHINE.

No. 549,302. Patented Nov. 5, 1895.

WITNESSES
G. S. Elliott.
E. W. Johnson.

INVENTORS
Elmer V. Williams
Stewart W. Jameson
by [signature]
Attorney

UNITED STATES PATENT OFFICE.

ELMER V. WILLIAMS AND STEWART W. JAMESON, OF CLINTON, ILLINOIS.

ADDING-MACHINE.

SPECIFICATION forming part of Letters Patent No. 549,302, dated November 5, 1895.

Application filed December 13, 1894. Renewed August 22, 1895. Serial No. 560,175. (No model.)

*To all whom it may concern:*

Be it known that we, ELMER V. WILLIAMS and STEWART W. JAMESON, citizens of the United States of America, residing at Clinton, in the county of De Witt and State of Illinois, have invented certain new and useful Improvements in Adding-Machines; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of our invention is to provide an adding-machine which is simple in operation, there being but ten keys to be operated, and each individual key being supported so that when depressed it will turn a shaft having a gear-wheel which communicates the motion to digit-wheels, the shaft also carrying double-pawl mechanism which engages with a rack-bar and is operated to cause the gear-wheel to engage the digit-wheels successively, the keys also engaging mechanism which prevents excessive movement of the operating-shaft.

The invention further embodies a construction in which the digit-wheels are provided with gear-wheels, one gear-wheel on each digit-wheel meshing with a corresponding gear-wheel loosely mounted on a shaft and having a laterally-projecting tooth which engages a gear-wheel on the adjoining digit-wheel, spring-actuated dogs being employed to prevent the accidental rotation of the digit-wheels.

The invention consists in the construction, combination, and organization of the parts, as will be hereinafter fully set forth, and particularly claimed.

Figure 1:
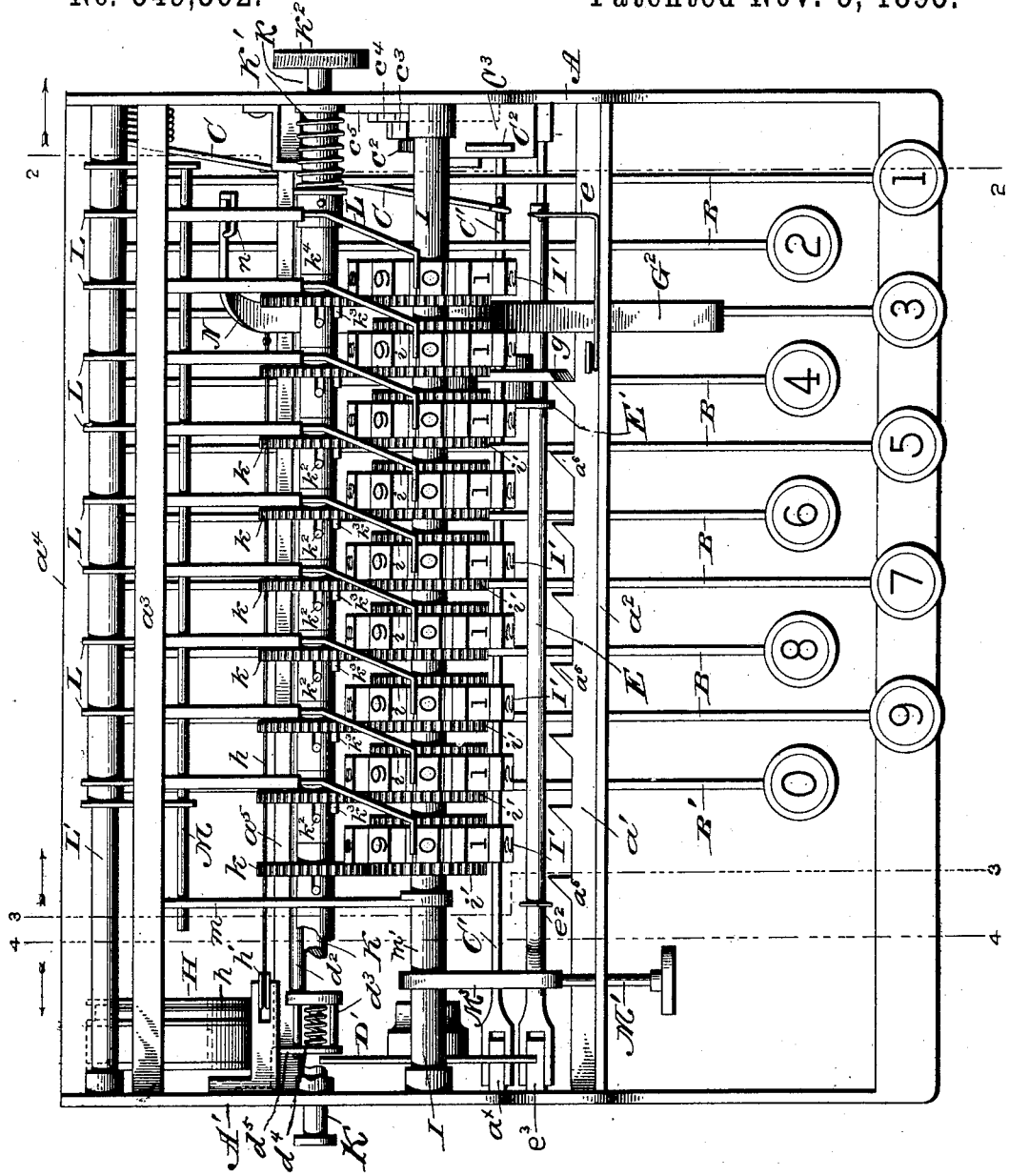
Figure 2:
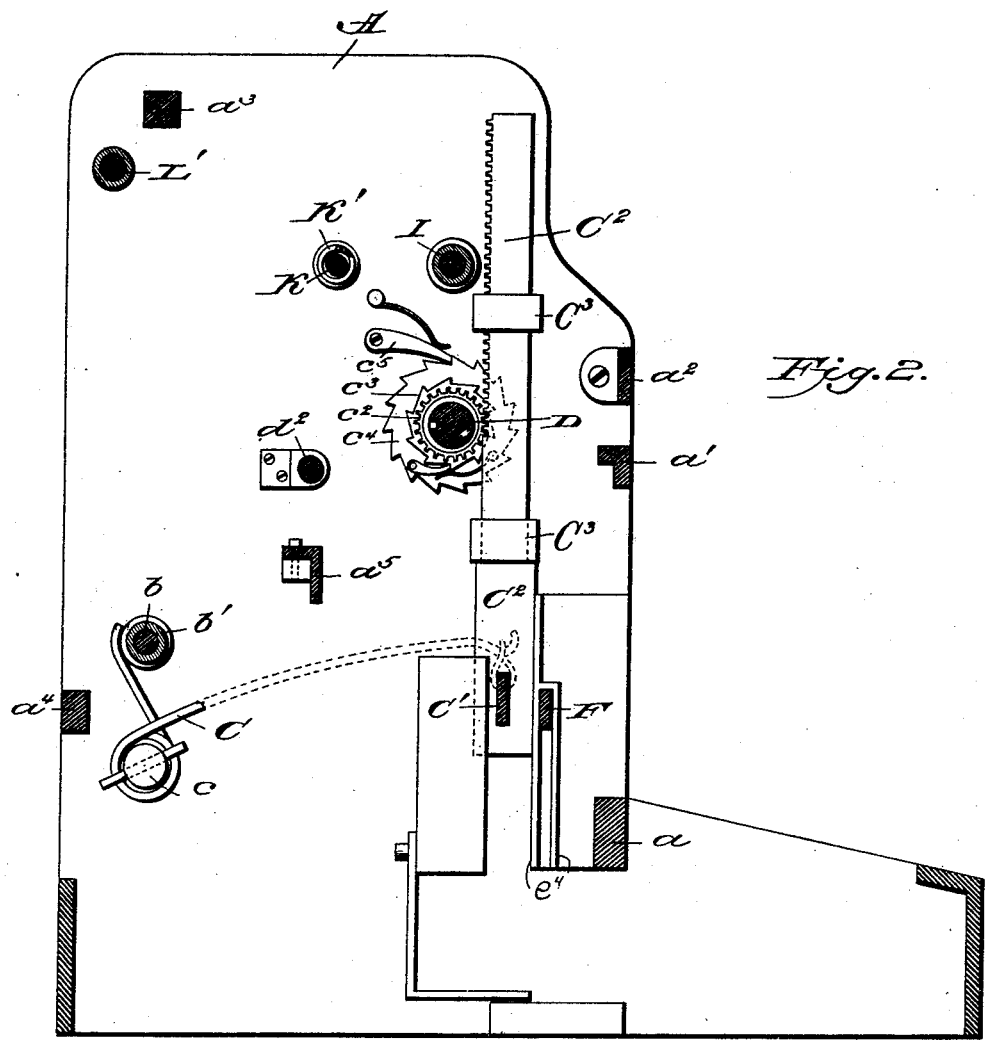
Figure 3:
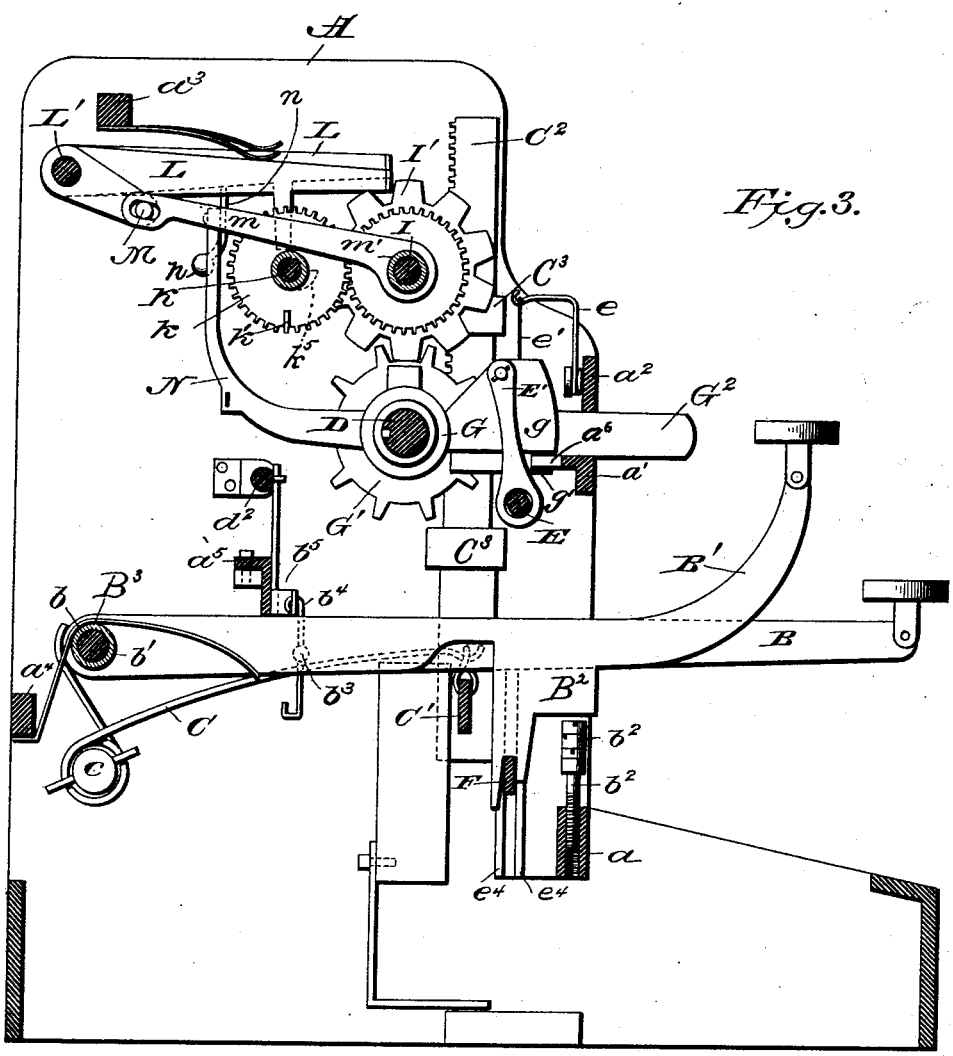
Figure 4:
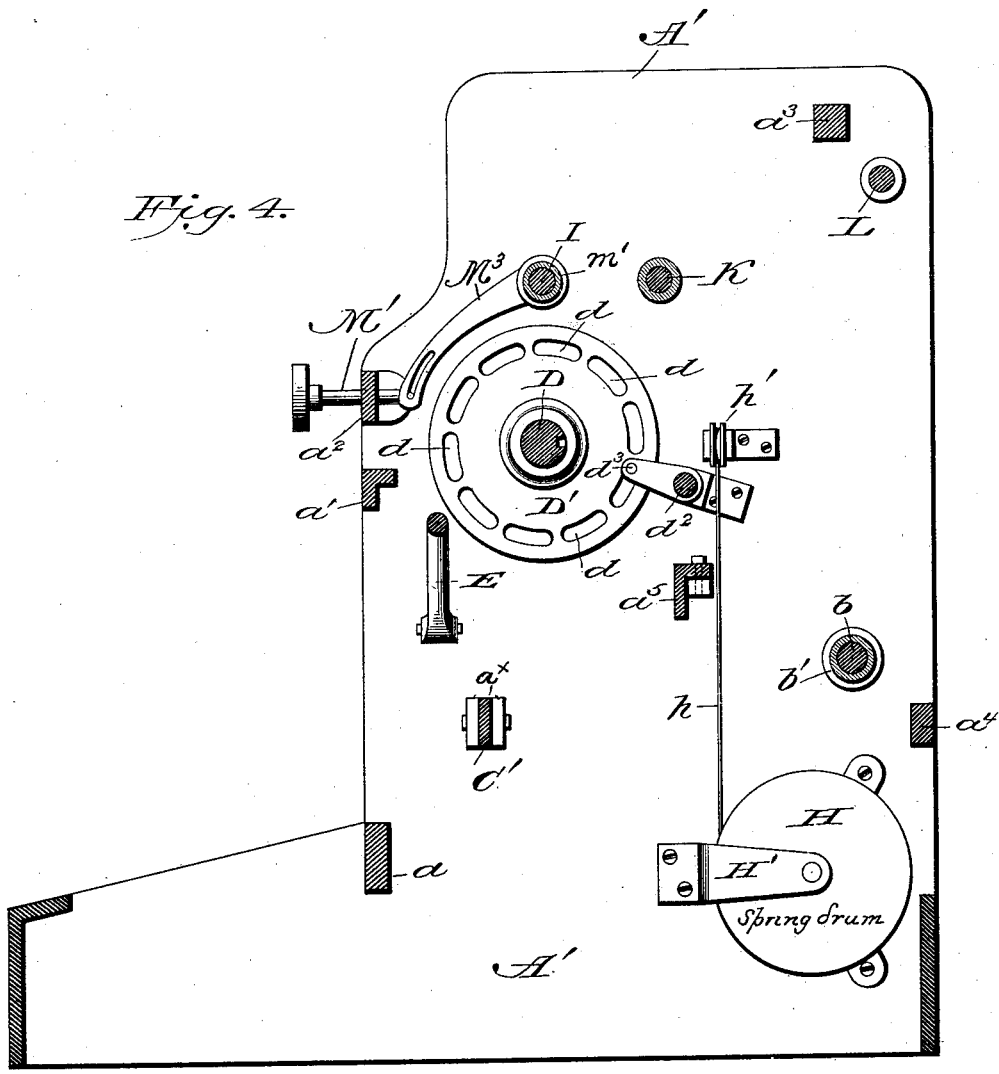
Figure 5:
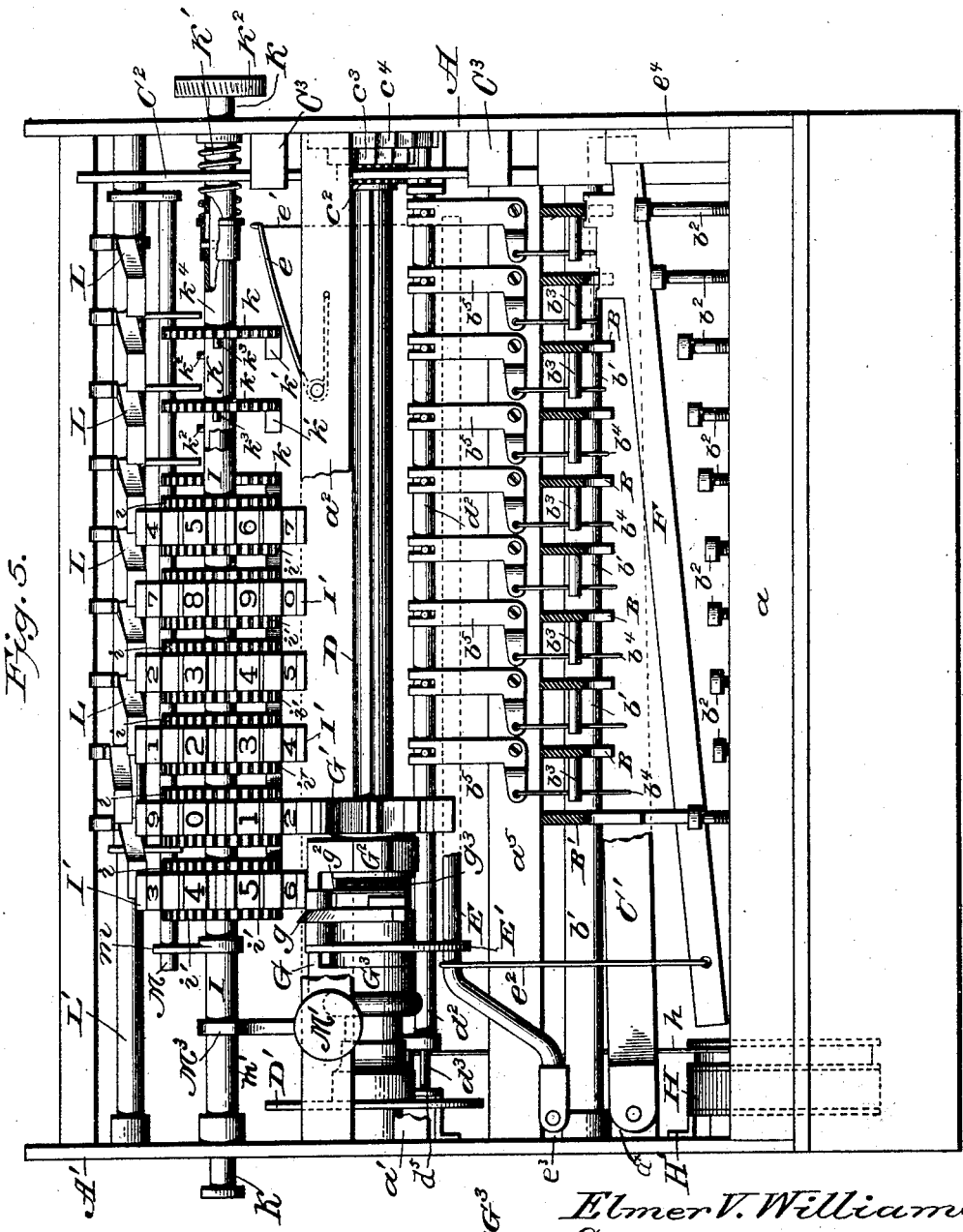
Figure 6:
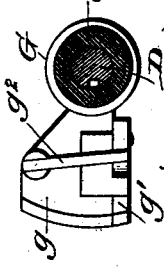

In the accompanying drawings, forming part of this specification, Figure 1 is a plan view of an adding-machine embodying our improvements. Fig. 2 is a vertical sectional view one the line 2 2 of Fig. 1. Fig. 3 is a vertical sectional view on the line 3 3 of Fig. 1. Fig. 4 is a sectional view on the line 4 4 of Fig. 1. Fig. 5 is a front elevation, the key-levers being in section and other parts broken away; and Fig 6 is a detail view of the double pawl.

The frame of the machine is provided with side pieces or plates A and A', which are connected by transverse bars $a$, $a'$, $a^2$, $a^3$, and $a^4$, said bars supporting parts of the operating mechanism. The bar $a'$ has teeth $a^6$ for a purpose hereinafter stated.

Extending transversely across the rear part of the frame between the plates A and A' is a bar $b$, upon which are mounted key-levers B, collars or sleeves $b'$ being placed upon the bar to properly space said levers. There are ten key-levers employed and they are all alike with the exception of the cipher-key B', which is provided with a depending portion $B^2$ for direct engagement with the double-pawl operating-lever hereinafter described. Each key-lever is provided with a spring $B^3$ for holding the outer end thereof normally elevated, said spring bearing against the cross-bar $a^4$, from which it extends over the bar $b$, the forward end engaging with the under side of its lever. The upward movement of the key-levers is limited by contact with the under side of the cross-bar $a^5$, and the downward movement of each key-lever is limited by a set-screw $b^2$, which enters a screw-threaded aperture in the bar $a$, one set-screw being provided for each lever, so that the several levers will have different limits of depression for the purpose hereinafter set forth.

Projecting inwardly from the plate A is a lug $c$, about which is coiled a spring C, the rearwardly-projecting end of said spring bearing against the cross-bar $b$, while the forwardly-projecting end is connected to one end of a lever C', the opposite end of said lever being pivoted to a lug $a^\times$, which projects from the plate A' of the frame. The tendency of the spring C is to force the free end of the lever C' upwardly, and said free end of the lever passes through a slot in the lower end of a vertical rack-bar $C^2$, carried by suitable guides or loops $C^3$, so that the teeth thereof will mesh with a pinion $c^2$, said pinion being loosely mounted on a shaft D, which extends transversely across the machine and is journaled in the side plates A and A'. The pinion is rigidly attached to a ratchet-wheel $c^3$, and adjoining the latter is a larger ratchet-wheel $c^4$, which is keyed to the shaft D, and carries a spring-actuated pawl engaging with the ratchet-wheel $c^3$, backward rotation of the ratchet-wheel $c^4$ being prevented by a pawl $c^5$, pivoted to the side piece A of the frame. The ratchet-wheel $c^3$ is mounted on the shaft, so that the teeth thereof are in reverse direction from the teeth of the ratchet-wheel $c^4$.

The lever C' underlies all the operating key-levers B, so that when one of said key-levers is depressed it will depress the lever C', which will slide the rack-bar $C^2$ and turn the pinion $c^2$, and the ratchet-wheel $c^3$, attached to said pinion, will engage the pawl on the ratchet-wheel $c^4$, and consequently cause a rotation of the shaft D in one direction only, as the pawl slides over the teeth of the ratchet-wheel $c^3$, when the levers return to their normal positions.

Upon the shaft D, adjoining the side-piece A' of the frame of the machine, is a disk D', which is rigidly attached to the shaft and provided with a series of concentric slots $d$. (See Fig. 4.) This disk is provided to prevent excessive movement of the shaft D when any one of the key-levers B has been depressed to its fullest extent, the key-levers operating a horizontally-sliding bar $d^2$ at the end of their downward movement, which enters the concentric slots in the disk D' and locks the shaft against further movement. The sliding bar $d^2$ is operated by bell-crank levers $b^5$, (see Fig. 5,) which are pivoted to the cross-bar $a^5$, and are connected at their upper ends by means of slots and pins to the sliding bar, their lower ends being provided with depending rods $b^4$, which pass through lugs $b^3$ on the key-levers, and have bent ends, so that when the key-levers are depressed to their fullest extent they will rock the bell-crank levers and cause the locking operation hereinbefore mentioned. As the key-levers have different limits of depression, and it is desired to operate the locking mechanism at the limit of each depression, the depending rods $b^4$ are of different lengths, as shown more clearly in Fig. 5. The sliding bar $d^2$ is held normally away from the disk by means of a suitable spring $d^4$. (See Fig. 1.) The end of the sliding bar $d^2$ does not engage directly with the disk D', but is provided with a right-angled arm carrying a pin $d^3$ (see Fig. 4) which does, the said end passing through a plate $d^5$, attached to the side piece A', for supporting the same.

E designates a lever which is pivoted at one end to a lug $e^3$, projecting from the side piece A' of the frame of the machine, the other end being supported by a spring $e$ attached to the transverse bar $a^2$, a link or connection $e'$ connecting the end of the lever to the spring, as shown in Figs. 1 and 5. The lever E is provided with a vertical bend adjoining its pivot, Fig. 5, and said lever supports an inclined bar F, which is suspended therefrom by means of a rod $e^2$, the said bar being guided at one end by strips $e^4$, secured to the side piece A of the frame, and at the other end by the depending bifurcated portion $B^2$ of the cipher-key B'. It will be noted that the inclination of the bar F is such that it will be depressed at near the limit of the movement of the key-levers, and that the depression of said bar will rock the lever E upon its pivot for the purpose hereinafter mentioned.

G designates a carriage which is mounted on the transverse shaft D so as to slide thereon, and this carriage is provided at one end with a wheel G', having ten peripheral teeth, the wheel being provided with a feather or spline, which moves in a longitudinal groove in the shaft D, so that said wheel will slide thereon and rotate therewith. The carriage is provided with an arm $G^2$, which projects therefrom forwardly between the bars $a'$ and $a^2$, (see Fig. 3,) and is for the purpose of moving the carriage longitudinally upon the shaft D. Within the carriage and upon the shaft D is mounted a sleeve $G^3$, which carries the double-pawl mechanism $g\ g'\ g^2$, the rigid part $g$ of the pawl being formed on said sleeve, while the movable part $g'$ is pivoted to the lower end of the rigid part and is actuated in one direction by the spring $g^2$. (see Fig. 6.) The double pawl is normally held to the limit of its upward movement by a spring $g^3$, (see Fig. 5,) which is wound around the sleeve $G^3$ and is attached to the pawl $g$, and when in this position the rigid part of the pawl will be above the ratchet-teeth $a^6$ of the transverse bar $a'$, while the movable part $g'$ will be in position to engage with the teeth on said bar. When the double pawl is depressed by the operation of the keys, as hereinafter set forth, the rigid part $g$ will engage the adjoining ratchet-tooth of the bar $a'$ and the part $g'$ moves to the opposite side of said tooth, so that when the pawl is elevated the carriage can move to the next tooth.

The pawl $g\ g'\ g^2$ is operated by an arm E', which is connected at one end to the lever E so as to slide thereon, and is attached at its other end to the rigid part $g$ of the pawl. (See Fig. 3.) By this connection when the lever E is depressed by engagement of the key-levers with the inclined bar F, the double pawl will be operated to move the carriage to the next tooth $a^6$ on the transverse bar $a'$, the carriage being automatically moved by a spring-actuated drum H, of ordinary construction, which is mounted in a bracket H', attached to the side piece A' of the frame, and is provided with a cord $h$ wound around the same, one end of the cord being attached to the drum, while the other end is led over a guide-pulley $h'$ and is attached to the carriage. (See Figs. 1 and 4.)

Above the shaft D and parallel therewith is a bar or rigid shaft I, upon which the digit-wheels of the device are loosely mounted side by side, said digit-wheels I' being provided with transverse grooves forming teeth with which the teeth of the wheel G' of the carriage G are adapted to engage. The digit-wheels are placed upon the shaft in relation to the teeth on the cross-bar $a'$, so that when the pawl $g\ g'\ g^2$ is in engagement with one of said teeth the wheel G' will be in engagement with the corresponding digit-wheel. The digit-wheels are provided on their right-hand side with a gear-wheel $i$ and on the other with a gear-wheel $i'$, the gear-wheel $i$ on one digit-wheel being adjacent to the gear-wheel $i'$ on the adjoining digit-wheel. The gear-wheels $i'$ mesh with gear-wheels $k$, loosely mounted on a transverse bar or shaft K, and these gear-wheels $k$ are each provided with a laterally-extended tooth $k'$, (see Figs. 3 and 5,) which engages with one of the teeth of the adjoining gear-wheel $i$ upon each rotation of the said gear-wheel $k$. The shaft K, upon which the gear-wheels $k$ are mounted, passes through the side pieces of the frame of the machine, so as to have a longitudinal movement, the shaft being provided with projecting pins $k^2$, which engage with pins $k^3$ projecting from one side of the gear-wheel $k$, the pins $k^2$ projecting through slots in the collars $k^4$, which properly space the gear-wheels. The pins $k^2$ are held out of the path of the pins $k^3$ by means of a helical spring K', which is interposed between a collar on the shaft and the side A of the frame, and the end of the shaft K is provided with a turning wheel K². This construction provides means whereby when the knob is grasped and drawn upon the pins or stud which project from the shaft will be brought on a line with and in the path of the pins or studs which project from the gear-wheels, so that by turning the shaft in the proper direction the gear-wheels $k$ will be rotated, and being in engagement with the digit-wheels will adjust the same to bring the numerals of the same value on a horizontal line and resets the digit-wheels to zero.

The digit-wheels are held against accidental rotation by spring-actuated pawls L, which are pivoted on a cross-bar L'. These pawls have their ends bent so that they will rest in the grooves in the periphery of the digit-wheels, and the pawls are provided with depending portions which engage with cam-projections $k^5$ on the hubs of the gear-wheels $k$, so that the pawls will be raised out of engagement with the digit-wheels while the laterally-projecting teeth $k'$ are in engagement with the gear-wheels $i$, in order to permit the carrying of the tens.

All the pawls L are held out of engagement with the digit-wheels while said digit-wheels are being set to zero by the shaft K, as hereinbefore described, by means of a rod M, (see Figs. 1 and 3,) which is pressed against the under side of the pawls by an arm $m$, which extends from a sleeve $m'$ (see Figs. 1 and 3) on the shaft I, the sleeve being turned by a push-rod M', which extends in front of the machine, said push-rod being connected to the slotted end of an arm M³ projecting from the sleeve $m'$.

N designates an arm which extends from the carriage G, and is provided with a gravity-pawl $n$, which engages with the pawls L, so as to raise the same out of engagement with the digit-wheel I', which is engaged by the wheel G' of the carriage, so that when one of the keys is operated to turn the wheel G', as hereinbefore described, the digit-wheel will be free to turn.

The foregoing description sets forth the construction of the apparatus, it being obvious that the number of digit-wheels can be increased beyond the number shown on the drawings, there being but nine digit-wheels shown, thereby limiting the capacity of the machine for adding to 999,999,999; and in practice the details of construction of the carriage and other parts may be varied, mechanical equivalents or means for producing the same result being substituted for the means we have shown. For instance, the double-pawl mechanism for locking the carriage against movement in one direction so as to permit it to be moved manually in the other direction can be changed by substituting for the mechanism shown the usual locking-pawls and tension-drum commonly used in type-writing machines, preserving at the same time the feature of a wheel which meshes with digit-wheels and is rotated by a shaft actuated by the depression of keys.

In operation the apparatus is first set to bring all the zeros on the digit-wheels on a line with each other, as hereinbefore described, and the carriage is moved to the right-hand end of the machine. In this position the rearwardly-projecting arm N holds the first pawl out of engagement with the first digit-wheel, and the parts are ready for adding. Now by simply depressing one of the keys the downward movement will be imparted to the vertical rack-bar so as to turn the shaft upon which the carriage is mounted and cause a rotation of said shaft and wheel keyed thereon, and the said wheel being in mesh with the first digit-wheel will cause a corresponding rotation of the same. The depression of the key also operates the double-pawl $g\ g'\ g^2$, so that the carriage will be moved to the next tooth $a^6$ on the cross-bar $a'$, and the sliding bar $d^2$ is moved to engage one of the slots in the disk D' to prevent excessive movement of the shaft. When the key is released, the carriage is moved by the tension device H $h$, so that the pawl $g\ g'\ g^2$ will engage the next tooth $a^6$, and in this position the arm N elevates the second pawl L and the wheel G' is in engagement with the second digit-wheel. When the keys marked with the numerals representing the first horizontal row of figures, or the first number to be added, have been depressed, the carriage is moved to the right-hand end of the machine by operating the projecting arm G², and the keys marked with the numerals representing the second row of figures, or second number to be added, are depressed. In depressing the key-levers for the numerals representing the second row of figures to be added, the digit-wheels, which complete a rotation, turn the next disk to the left one space by means of the gear-wheels $k$ in order to carry the tens.

The above operation is repeated for each horizontal row of figures in the example to be added, and it will be noted that in depressing the key having the "0" marked thereon, or "cipher-key," the bar F is simply depressed so as to move the carriage one space without turning a digit-wheel. When all the keys having the figures in the example have been depressed upon the keyboard, the horizontal line of numerals immediately in front of the pawls L will give the sum total.

The device can be used in adding by vertical columns, and in this case the carriage is held at the first digit-wheel to the right and the keys representing the several figures of the right-hand column are depressed one after the other, each complete rotation of the first digit-wheel moving the second digit-wheel one space. When the first column has been added, the second column is added by moving the carriage to the second digit-wheel and the third by moving it to the third digit-wheel, and so on. Dogs may be attached to the cross-bar $a^2$ for holding the carriage at the different digit-wheels when it is desired to add by vertical columns.

The operation of the device is extremely simple and there are but ten keys to manipulate, the vertical movement of said keys varying as to the value thereof.

Having thus described our invention, what we claim as new, and desire to secure by Letters Patent, is—

1. In an adding machine, the combination, of a series of revoluble digit-wheels having gearwheels one on each side, gearwheels loosely mounted on a shaft and meshing with one of the gearwheels on each digit-wheel, said gearwheels each having a laterally-extended tooth which engages the other gearwheels on the digit-wheels, pins projecting from the sides of the loosely mounted gearwheels and pins upon the shaft, the shaft being adapted to be moved longitudinally so that the pins will engage to adjust the digit-wheels, substantially as described.

2. In an adding machine, the combination with a series of revoluble digit-wheels which are geared to loosely-mounted gearwheels, the latter having hubs with cam-projections, of locking-pawls which engage with the digit-wheels and rest upon the hubs having the cam-projections, so that the pawls will be disengaged by the complete rotation of the digit-wheels.

3. In an adding machine, the combination, of a plurality of digit-wheels having transverse grooves, pawls adapted to engage with said grooves, gearwheels in mesh with gear wheels carried by the digit-wheels and provided with cam-projections which engage the pawls, a traveling carriage having a wheel actuated by the depression of a key, and an arm projecting from the carriage to disengage the pawls in succession as the carriage advances, substantially as shown and for the purpose set forth.

4. In an adding machine, the combination, of a carriage mounted so as to move longitudinally upon a shaft, said carriage having a gearwheel which rotates with the shaft, digit-wheels in mesh with said gearwheel, and is pivoted keys supported so that when depressed they will actuate a rack-bar in gear with a gear-wheel on the shaft and intermediate mechanism for causing the shaft to turn in one direction.

5. In an adding machine constructed substantially as shown, a shaft rotated in one direction by the depression of keys, a carriage mounted on said shaft and having a gearwheel which is connected to rotate with the shaft, a disk keyed to the shaft and having concentric slots therein, and a sliding-bar actuated by the keys for engagement with the slots to lock the disk and shaft against rotation when the key has reached the limit of its downward movement.

6. In an adding machine having pivoted keys, a lever arranged transversely under the keys to be operated thereby, said lever being spring-actuated in an upward direction and attached at one end to a vertically-movable rack-bar, a shaft having rigidly attached thereto a ratchet-wheel with which a pawl carried by the frame of the machine engages, a ratchet wheel and gearwheel loosely mounted on the shaft side by side so that the ratchet-wheel will engage a pawl carried by the first mentioned ratchet-wheel and the gearwheel engage the vertically movable rack-bar, a carriage carried by the shaft and adapted to move longitudinally thereon, a gearwheel carried by the carriage and connected to the shaft so as to rotate therewith, mechanism for moving the carriage step by step, said mechanism engaging a horizontal ratchet-bar supported by the frame of the machine, a bar connected to the mechanism for operating the same by the depression of the keys, and digit-wheels located on a shaft so as to be engaged by the gearwheel on the carriage.

7. In an adding machine having a series of digit-wheels and a carriage for imparting motion to said digit-wheels by the depression of keys, pawls for locking the digit-wheels, and an arm projecting from the carriage for holding one of the pawls out of engagement with the digit-wheel which is to be actuated by the depression of a key.

8. In an adding machine, the combination, of a plurality of digit-wheels loosely mounted on a shaft, a carriage having a gearwheel which turns with the shaft and engages the digit-wheels successively, a double-pawl carried by the carriage and engaging a ratchet-bar supported by the frame of the machine, the double-pawl being connected to a lever located transversely under the keys, a spring-actuated drum for moving the carriage in one direction, and a projecting arm for moving the carriage against the action of the spring drum.

9. In an adding machine, the combination, of a plurality of digit-wheels having transverse grooves or recesses, gearwheels one on each side of the digit-wheels, pawls in engagement with the digit-wheels, an arm mounted on the shaft that carries the digit-wheels, a series of gearwheels having cam-projections on one side, laterally-extended teeth and projecting pins, the shaft upon which said gearwheels are mounted being longitudinally movable in its bearings and having projecting pins which are adapted to engage the pins projecting from the gearwheels, the pawls mounted on the frame and engaging the digit-wheels having projecting portions which engage the cam-projections on the gear-wheels, and a swinging bar or rod connected to the arm supported by the shaft of the digit-wheels, said bar or rod being adapted to be moved against the under side of the pawls, substantially as shown and for the purpose set forth.

In testimony whereof we affix our signatures in presence of two witnesses.

ELMER V. WILLIAMS.
STEWART W. JAMESON.

Witnesses:
R. A. LEMON,
DAISY P. EDMISTON.